(12) United States Patent
Zerillo et al.

(10) Patent No.: US 8,976,938 B2
(45) Date of Patent: Mar. 10, 2015

(54) DELUXE EMERGENCY NOTIFICATION

(75) Inventors: Anthony J. Zerillo, Kansas City, MO (US); Gregory K. Embry, Leawood, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 1230 days.

(21) Appl. No.: 12/168,668

(22) Filed: Jul. 7, 2008

(65) Prior Publication Data

US 2010/0002845 A1    Jan. 7, 2010

(51) Int. Cl.
*H04M 11/04* (2006.01)
*H04M 3/51* (2006.01)

(52) U.S. Cl.
CPC ... *H04M 3/5116* (2013.01); *H04Q 2213/13103* (2013.01); *H04Q 2213/13106* (2013.01); *H04Q 2213/13336* (2013.01); *H04Q 2213/1337* (2013.01); *H04Q 2213/13377* (2013.01)
USPC .............................................. 379/42; 379/48

(58) Field of Classification Search
CPC ....... H04W 6/007; H04W 4/22; H04W 4/001; H04M 2242/04; H04M 11/04; H04M 2242/30; H04M 1/72536; H04M 7/006; H04M 3/5116; H04M 3/42221
USPC ........... 379/37–51, 88.12, 67.1, 88.04, 88.08, 379/88.19–88.23, 88.26–88.27, 142.06; 455/404.1, 404.2, 405, 521, 412.1
See application file for complete search history.

(56) References Cited

U.S. PATENT DOCUMENTS

| | | |
|---|---|---|
| 5,339,351 A | 8/1994 | Hoskinson et al. |
| 5,379,337 A | 1/1995 | Castillo et al. |
| 5,497,149 A | 3/1996 | Fast |
| 5,555,286 A | 9/1996 | Tendler |
| 5,646,987 A | 7/1997 | Gerber et al. |
| 5,937,038 A | 8/1999 | Bell et al. |
| 6,137,877 A | 10/2000 | Robin et al. |
| 6,240,285 B1 | 5/2001 | Blum et al. |
| 6,317,049 B1 | 11/2001 | Toubia et al. |
| 6,366,772 B1 | 4/2002 | Arnson |
| 6,415,018 B1 | 7/2002 | Antonucci et al. |
| 6,480,578 B1 | 11/2002 | Allport |

(Continued)

OTHER PUBLICATIONS

Dale N. Hatfield, "A Report on Technical and Operational Issues Impacting the Provision of Wireless Enhanced 911 Services," Federal Communications Commission, printed from the World Wide Web on May 8, 2006 (54 pages).

(Continued)

*Primary Examiner* — Akelaw Teshale
(74) *Attorney, Agent, or Firm* — Swanson & Bratschun, L.L.C.

(57) ABSTRACT

An emergency notification system is provided including a switching unit, a plurality of communications devices communicatively in communication with the switching unit, an emergency response unit in communication with the switching unit, a plurality of receiving units in communication with the switching unit. Each of the communications devices is configured to transmit an emergency notification to the switching unit which includes a message and at least one receiving unit address. Further, the switching unit is configured to receive the emergency notification from at least one of the plurality of communication devices and to rebroadcast the emergency notification contained in the message to the emergency response unit and to the receiving unit corresponding to the receiving unit address.

17 Claims, 5 Drawing Sheets

(56) References Cited

U.S. PATENT DOCUMENTS

| | | | |
|---|---|---|---|
| 6,526,125 B1 | 2/2003 | Lindsay et al. | |
| 6,591,112 B1 | 7/2003 | Siccardo et al. | |
| 6,642,844 B2 | 11/2003 | Montague | |
| 6,678,357 B2 | 1/2004 | Stumer et al. | |
| 6,690,932 B1 | 2/2004 | Barnier et al. | |
| 6,771,163 B2 | 8/2004 | Linnett et al. | |
| 6,839,022 B1 | 1/2005 | Benco et al. | |
| 7,026,925 B2 | 4/2006 | Roche et al. | |
| 7,079,627 B2 | 7/2006 | Crago et al. | |
| 7,095,733 B1 | 8/2006 | Yarlgadda et al. | |
| 7,098,787 B2 | 8/2006 | Miller | |
| 7,231,218 B2 | 6/2007 | Diacakis et al. | |
| 7,269,413 B2 | 9/2007 | Kraft | |
| 7,342,917 B2* | 3/2008 | Mohan et al. | 370/352 |
| 7,386,103 B1 | 6/2008 | Chahal | |
| 7,418,087 B2 | 8/2008 | Luneau et al. | |
| 7,496,189 B2 | 2/2009 | Clarisse et al. | |
| 7,574,194 B2* | 8/2009 | Yang et al. | 455/404.1 |
| 7,679,505 B1 | 3/2010 | Vallaire | |
| 7,706,356 B1 | 4/2010 | Olshansky et al. | |
| 7,734,019 B1 | 6/2010 | Terpstra | |
| 7,773,975 B2 | 8/2010 | Snapp et al. | |
| 7,920,679 B1* | 4/2011 | Naim et al. | 379/45 |
| 7,991,135 B2 | 8/2011 | Rauba et al. | |
| 8,014,341 B1 | 9/2011 | Ray | |
| 8,102,986 B1 | 1/2012 | McClintock et al. | |
| 8,295,801 B2 | 10/2012 | Ray et al. | |
| 8,320,871 B2 | 11/2012 | Ray et al. | |
| 8,364,113 B2 | 1/2013 | Ray et al. | |
| 8,447,267 B2 | 5/2013 | Ray et al. | |
| 8,615,214 B2 | 12/2013 | Jain et al. | |
| 8,630,609 B2 | 1/2014 | Ray et al. | |
| 8,712,366 B2 | 4/2014 | Greene et al. | |
| 8,718,595 B2 | 5/2014 | Ray et al. | |
| 8,891,749 B2 | 11/2014 | Geldbach et al. | |
| 8,923,803 B2 | 12/2014 | Ray et al. | |
| 2001/0003843 A1 | 6/2001 | Scepanovic et al. | |
| 2001/0004588 A1 | 6/2001 | Hong | |
| 2001/0012379 A1 | 8/2001 | Amemiya et al. | |
| 2002/0012323 A1 | 1/2002 | Petite et al. | |
| 2002/0016189 A1 | 2/2002 | Sheynblat et al. | |
| 2002/0054667 A1 | 5/2002 | Martinez | |
| 2002/0136363 A1 | 9/2002 | Stumer et al. | |
| 2003/0012344 A1 | 1/2003 | Agarwal et al. | |
| 2003/0063714 A1 | 4/2003 | Stumer et al. | |
| 2003/0109245 A1 | 6/2003 | McCalmont et al. | |
| 2003/0133450 A1 | 7/2003 | Baum | |
| 2003/0158668 A1 | 8/2003 | Anderson | |
| 2004/0072583 A1 | 4/2004 | Weng | |
| 2004/0077347 A1 | 4/2004 | Lauber et al. | |
| 2004/0090950 A1 | 5/2004 | Lauber et al. | |
| 2004/0176123 A1 | 9/2004 | Chin et al. | |
| 2004/0257273 A1 | 12/2004 | Benco et al. | |
| 2005/0002499 A1* | 1/2005 | Ordille et al. | 379/88.12 |
| 2005/0003797 A1 | 1/2005 | Baldwin | |
| 2005/0070315 A1 | 3/2005 | Rai et al. | |
| 2005/0101287 A1 | 5/2005 | Jin et al. | |
| 2005/0111630 A1 | 5/2005 | Potorny et al. | |
| 2005/0123102 A1 | 6/2005 | Beason et al. | |
| 2005/0151642 A1 | 7/2005 | Tupler et al. | |
| 2005/0159132 A1* | 7/2005 | Wright et al. | 455/404.1 |
| 2005/0169248 A1 | 8/2005 | Truesdale et al. | |
| 2005/0197096 A1* | 9/2005 | Yang et al. | 455/404.1 |
| 2005/0201358 A1 | 9/2005 | Nelson et al. | |
| 2005/0209781 A1 | 9/2005 | Anderson | |
| 2005/0232225 A1 | 10/2005 | Pelaez et al. | |
| 2005/0265326 A1 | 12/2005 | Laliberte | |
| 2006/0009190 A1 | 1/2006 | Laliberte | |
| 2006/0043164 A1 | 3/2006 | Dowling et al. | |
| 2006/0052134 A1 | 3/2006 | Sato | |
| 2006/0072547 A1 | 4/2006 | Florkey et al. | |
| 2006/0133582 A1 | 6/2006 | McCulloch | |
| 2006/0217136 A1 | 9/2006 | Bantukul et al. | |
| 2006/0219542 A1 | 10/2006 | Savir | |
| 2006/0234726 A1 | 10/2006 | Ashley et al. | |
| 2006/0234727 A1 | 10/2006 | Ashley et al. | |
| 2006/0293024 A1 | 12/2006 | Benco et al. | |
| 2007/0003024 A1 | 1/2007 | Olivier et al. | |
| 2007/0041368 A1 | 2/2007 | Lorello et al. | |
| 2007/0064882 A1* | 3/2007 | Ger et al. | 379/33 |
| 2007/0121851 A1 | 5/2007 | Maropis et al. | |
| 2007/0201391 A1 | 8/2007 | Belmonte et al. | |
| 2007/0273519 A1 | 11/2007 | Ichikawa et al. | |
| 2007/0280428 A1 | 12/2007 | McClelland | |
| 2007/0287473 A1 | 12/2007 | Dupray | |
| 2008/0018452 A1* | 1/2008 | McCarthy et al. | 340/531 |
| 2008/0026728 A1 | 1/2008 | Snapp et al. | |
| 2008/0057944 A1 | 3/2008 | Miriyala et al. | |
| 2008/0064363 A1 | 3/2008 | Salafia et al. | |
| 2008/0064375 A1 | 3/2008 | Gottlieb | |
| 2008/0070546 A1* | 3/2008 | Lee | 455/404.2 |
| 2008/0144779 A1 | 6/2008 | Ray et al. | |
| 2008/0200143 A1 | 8/2008 | Qiu et al. | |
| 2008/0261557 A1 | 10/2008 | Sim | |
| 2008/0273670 A1 | 11/2008 | Dickinson | |
| 2008/0304630 A1* | 12/2008 | Nguyen et al. | 379/45 |
| 2009/0047924 A1 | 2/2009 | Ray et al. | |
| 2009/0086932 A1 | 4/2009 | Ray | |
| 2009/0097474 A1 | 4/2009 | Ray et al. | |
| 2009/0144260 A1 | 6/2009 | Bennett et al. | |
| 2009/0186596 A1 | 7/2009 | Kaltsukis | |
| 2009/0197567 A1 | 8/2009 | Ogram | |
| 2009/0214011 A1 | 8/2009 | Geldbach et al. | |
| 2009/0227225 A1 | 9/2009 | Mitchell et al. | |
| 2009/0305730 A1 | 12/2009 | Herz et al. | |
| 2009/0310602 A1 | 12/2009 | Olshansky et al. | |
| 2010/0002846 A1 | 1/2010 | Ray et al. | |
| 2010/0003946 A1 | 1/2010 | Ray et al. | |
| 2010/0003947 A1 | 1/2010 | Ray et al. | |
| 2010/0003949 A1 | 1/2010 | Ray et al. | |
| 2010/0003954 A1 | 1/2010 | Ray et al. | |
| 2010/0003955 A1 | 1/2010 | Ray et al. | |
| 2010/0003961 A1 | 1/2010 | Ray et al. | |
| 2010/0098062 A1 | 4/2010 | Croak et al. | |
| 2010/0107192 A1 | 4/2010 | Sennett et al. | |
| 2010/0142386 A1 | 6/2010 | Snapp et al. | |
| 2010/0215153 A1 | 8/2010 | Ray et al. | |
| 2010/0291894 A1 | 11/2010 | Pipes | |
| 2011/0014923 A1 | 1/2011 | Krco et al. | |
| 2011/0096769 A1 | 4/2011 | Sim | |
| 2012/0214437 A1 | 8/2012 | Ray et al. | |
| 2012/0309340 A1 | 12/2012 | Ray | |
| 2013/0012156 A1 | 1/2013 | Ray et al. | |
| 2013/0059560 A1 | 3/2013 | Ray et al. | |
| 2013/0102269 A1 | 4/2013 | Ray et al. | |
| 2013/0217355 A1 | 8/2013 | Ray et al. | |
| 2013/0237181 A1 | 9/2013 | Ray | |

OTHER PUBLICATIONS

ANSI, "TIA Standard Telecommunications Telephone Terminal Equipment Caller Identity and Visual Message Waiting Indicator Equipment Performance Requirements," TIA-777-A, Revision of TIA/EIA-777, May 1, 2003 (77 pages).

Micro Engineering Labs, Inc., "Caller ID", Retrieved from the Internet at URL: <http://www.melabs.com/resources/callerid.htm> on Apr. 24, 2006; Copyright 2006 by microEngineering Labs, Inc (as of date of retrieval, article last updated Apr. 16, 2006) (3 pages).

Dave Ryan & Asher Hazanchuk, "On-Hook & Off-Hook Caller ID Using DSP," Circuit Cellular INK # 83, Jun. 1997 (12 pages).

Ittiam Systems, "Caller Identification (CLI or Caller ID)," Retrieved from the Internet on Apr. 24, 2006 at URL <http://www.ittiam.com/pages/products/cid.htm, downloaded from the World Wide Web on Apr. 24, 2006 (2 pages).

Non-Final Rejection mailed Jan. 19, 2011 for U.S. Appl. No. 11/430,232.

Non-Final Rejection mailed Mar. 17, 2011 for U.S. Appl. No. 11/640,714.

RCE filed on Apr. 4, 2011 for U.S. Appl. No. 11/891,784.

Anal Rejection mailed Jan. 3, 2011 for U.S. Appl. No. 11/891,784.

Non-Final Rejection mailed Mar. 4, 2011 for U.S. Appl. No. 12/257,424.

(56) References Cited

OTHER PUBLICATIONS

"NENA Recommended Generic Standards for E9-1-1 PSAP Equipment" NENA Technical Reference. NENA-04-001 Issue 2, Mar. 2001.
Non-Final Rejection mailed Mar. 28, 2011 for U.S. Appl. No. 12/272,238.
Non-Final Rejection mailed Apr. 1, 2011 for U.S. Appl. No. 12/257,655.
Non-Final Rejection mailed Mar. 3, 2011 for U.S. Appl. No. 12/257,416.
Non-Final Rejection mailed Mar. 17, 2011 for U.S. Appl. No. 12/257,640.
Response filed Nov. 2, 2010 for U.S. Appl. No. 11/891,784.
"AT & T Wireless Unleashes the First and Only Wireless Messaging Device", PhysOrg.com, Sep. 30, 2004; available online at URL: <http://www.physorg.com/news1392.html> (12 pages).
Non-Final Office Action date mailed Aug. 3, 2010 for U.S. Appl. No. 11/891,784.
U.S. Appl. No. 11/430,232; Notice of Allowance dated May 13, 2011; 12 pages.
U.S. Appl. No. 11/430,232; Issue Notification dated Aug. 17, 2011; 1 page.
U.S. Appl. No. 11/640,714; Non-Final Rejection dated Sep. 15, 2011; 15 pages.
U.S. Appl. No. 11/640,714; Final Rejection dated Feb. 29, 2012; 17 pages.
U.S. Appl. No. 11/904,883; Non-Final Rejection dated Oct. 7, 2011; 19 pages.
U.S. Appl. No. 11/904,883; Final Rejection dated Apr. 27, 2012; 16 pages.
U.S. Appl. No. 12/257,424; Non-Final Rejection dated Jan. 31, 2012; 21 pages.
U.S. Appl. No. 12/257,424; Final Rejection dated Jul. 14, 2011; 19 pages.
U.S. Appl. No. 11/974,775; Notice of Allowance dated Apr. 27, 2012; 12 pages.
U.S. Appl. No. 11/974,775; Non-Final Rejection dated Nov. 7, 2011; 19 pages.
U.S. Appl. No. 11/974,775; Non-Final Rejection dated May 10, 2011; 24 pages.
U.S. Appl. No. 12/070,909; Final Rejection dated Jan. 10, 2012; 9 pages.
U.S. Appl. No. 12/070,909; Non-Final Rejection dated Aug. 16, 2011; 13 pages.
U.S. Appl. No. 12/257,574; Final Rejection dated Dec. 29, 2011; 18 pages.
U.S. Appl. No. 12/257,574; Non-Final Rejection dated Jul. 6, 2011; 20 pages.
U.S. Appl. No. 12/257,624; Final Rejection dated Jan. 31, 2012; 14 pages.
U.S. Appl. No. 12/257,624; Non-Final Rejection dated Oct. 6, 2011; 19 pages.
U.S. Appl. No. 12/257,641; Notice of Allowance dated Feb. 2, 2012; 12 pages.
U.S. Appl No. 12/257,641; Non-Final Rejection dated May 24, 2011; 17 pages.
U.S. Appl. No. 12/257,928; Non-Final Rejection dated Jun. 8, 2011; 21 pages.
U.S. Appl. No. 12/257,862; Final Rejection dated Nov. 30, 2011; 15 pages.
U.S, Appl. No. 12/257,862; Non-Final Rejection dated May 24, 2011; 19 pages.
U.S. Appl. No. 12/272,238; Pre-Brief Appeal Conference Decision dated Jan. 17, 2012; 2 pages.
U.S. Appl. No. 12/272,238; Notice of Appeal and Pre-Brief Conference Request dated Dec. 28, 2011; 6 pages.
U.S. Appl. No. 12/272,238; Final Rejection dated Sep. 29, 2011; 12 pages.
U.S. Appl. No. 11/891,784; Notice of Allowance dated Jul. 18, 2012; 27 pages.
U.S. Appl. No. 11/974,775; Notice of Allowance dated Jun. 12, 2012; 15 pages.
U.S. Appl. No. 12/257,424; Final Rejection dated Jun. 13, 2012; 41 pages.
U.S. Appl. No. 12/257,641; Notice of Allowance dated Aug. 2, 2012; 17 pages.
U.S. Appl. No. 12/272,238; Notice of Allowance dated Jun. 8, 2012; 21 pages.
U.S. Appl. No. 12/257,424; Non-Final Rejection dated Jul. 8, 2013; 46 pages.
U.S. Appl. No. 12/257,862; Non-Final Rejection dated Aug. 23, 2013; 29 pages.
U.S. Appl. No. 13/715,808; Notice of Allowance dated Sep. 13, 2013; 27 pages.
U.S. Appl. No. 13/847,388; Non-Final Office Action dated Jul. 17, 2013; 54 pages.
U.S. Appl. No. 11/891,784; Issue Notification dated Sep. 26, 2012; 1 page.
U.S. Appl. No. 11/904,883; Non-Final Rejection dated Oct. 11, 2012; 26 pages.
U.S. Appl. No. 11/974,775; Corrected Notice of Allowability dated Aug. 31, 2012; 7 pages.
U.S. Appl. No. 11/974,775; Issue Notification dated Sep. 26, 2012; 1 page.
U.S. Appl. No. 12/195,607; Issue Notification dated May 2, 2012; 1 page.
U.S. Appl. No. 12/257,574; Notice of Allowance dated Sep. 14, 2012; 25 pages.
U.S. Appl. No. 12/272,238; Issue Notification dated Oct. 3, 2012; 1 page.
U.S. Appl. No. 13/460,507; Non-Final Rejection dated Aug. 16, 2012; 28 pages.
U.S. Appl. No. 12/257,624; Non-Final Rejection dated Oct. 16, 2013; 38 pages.
U.S. Appl. No. 12/391,503; Non Final Office Action dated Oct. 25, 2013; 23 pages.
U.S. Appl. No. 12/257,928; Non-Final Rejection dated Nov. 20, 2013; 35 pages.
U.S. Appl. No. 12/257,424; Final Rejection dated Nov. 21, 2013; 34 pages.
U.S. Appl. No. 12/257,862; Notice of Allowance dated Dec. 6, 2013; 21 pages.
U.S. Appl. No. 13/847,388; Non-Final Office Action dated Dec. 9, 2013; 34 pages.
U.S. Appl. No. 13/460,507; Notice of Allowance dated Dec. 20, 2013; 20 pages.
U.S. Appl. No. 13/715,808; Issue Notification dated Dec. 24, 2013; 1 page.
Federal Standard 1037C: Telecommunications: Glossary of Telecommunication Terms. National Communication System. Technology and Standards Division. Washington, DC: General Services Administration, Information Technology Service, 1996. pp. vii, A-28, H-7, O.
U.S. Appl. No. 12/391,503; Final Rejection dated May 24, 2012; 19 pages.
U.S. Appl. No. 12/391,503; Non Final Office Action dated Feb. 16, 2012; 9 pages.
U.S. Appl. No. 11/640,714; Non-Final Rejection dated May 29, 2014; 50 pages.
U.S. Appl. No. 11/904,883; Non Final Rejection dated Jun. 10, 2014; 15 pages.
U.S. Appl. No. 12/070,909; Notice of Allowance dated Jul. 23, 2014; 33 pages.
U.S. Appl. No. 12/257,424; Notice of Allowance dated Aug. 11, 2014; 36 pages.
U.S. Appl. No. 12/257,624; Final Office Action dated May 13, 2014; 28 pages.
U.S. Appl. No. 12/257,928; Issue Notification dated Jun. 25, 2014; 1 page.
U.S. Appl. No. 12/391,503; Final Rejection dated Jun. 5, 2014; 39 pages.
U.S. Appl. No. 13/847,388; Non-Final Rejection dated Jul. 17, 2014; 39 pages.

(56) References Cited

OTHER PUBLICATIONS

U.S. Appl. No. 13/848,649; Non-Final Rejection dated Jul. 17, 2014; 21 pages.
U.S. Appl. No. 11/904,883; Non Final Rejection dated Apr. 19, 2013; 22 pages.
U.S. Appl. No. 12/257,862; Non-Final Rejection dated Mar. 13, 2013; 30 pages.
U.S. Appl. No. 13/460,507; Non-Final Rejection dated Apr. 26, 2013; 19 pages.
U.S. Appl. No. 13/614,585; Issue Notification dated May 1, 2013; 1 page.
U.S. Appl. No. 13/715,808; Non-Final Rejection dated Apr. 9, 2013; 36 pages.
U.S. Appl. No. 12/257,574; Issue Notification dated Jan. 9, 2013; 1 page.
U.S. Appl. No. 12/257,641; Issue Notification dated Nov. 7, 2012; 1 page.
U.S. Appl. No. 13/150,725; Non-Final Rejection dated Nov. 26, 2012; 19 pages.
U.S. Appl. No. 13/460,507; Final Rejection dated Dec. 20, 2012; 14 pages.
U.S. Appl. No. 13/614,585; Notice of Allowance dated Dec. 11, 2012; 30 pages.
U.S. Appl. No. 11/904,883; Non Final Rejection dated Feb. 5, 2014; 19 pages.
U.S. Appl. No. 12/257,424; Non-Final Rejection dated Apr. 17, 2014; 39 pages.
U.S. Appl. No. 12/257,862; Issue Notification dated Apr. 9, 2014; 1 page.
U.S. Appl. No. 12/257,928; Notice of Allowance dated Mar. 6, 2014; 20 pages.
U.S. Appl. No. 13/460,507; Issue Notification dated Apr. 16, 2014; 1 page.
U.S. Appl. No. 13/612,558; Non-Final Rejection dated Apr. 11, 2014; 37 pages.
U.S. Appl. No. 13/847,388; Final Rejection dated Apr. 7, 2014; 36 pages.
U.S. Appl. No. 11/640,714; Notice of Allowance dated Dec. 12, 2014; 41 pages.
U.S. Appl. No. No. 11/904,883; Notice of Allowance dated Oct. 8, 2014; 17 pages.
U.S. Appl. No. 12/070,909; Issue Notification dated Oct. 29, 2014; 1 page.
U.S. Appl. No. 12/257,424; Issue Notification dated Dec. 10, 2014; 1 page.
U.S. Appl. No. 13/612,558; Notice of Allowance dated Sep. 16, 2014; 16 pages.
U.S. Appl. No. 13/847,388; Final Rejection dated Dec. 4, 2014; 39 pages.

* cited by examiner

DELUXE EMERGENCY NOTIFICATION

BACKGROUND

In an emergency situation, time and information are of critical importance. Various individuals in an organization need to receive information relating to the time and place an emergency occurred and who was involved in the emergency so that the situation can be assessed properly. Currently, numerous types of emergency monitoring systems exist such as 911 call centers. These centers are equipped to receive emergency notifications and to send help. However, secondary notification of an emergency is outside the scope of a 911 call center's capabilities.

Currently, secondary notification of an emergency currently occurs via word of mouth or through complex call chains established and managed by an organization. However, these types of secondary notification systems require input from individuals and are inefficient. For example, when a 911 call is placed on a conventional phone system, the message is forwarded to a 911 call center which queries a ALI database to determine the location of the caller. Therefore, information concerning the caller is not transferred to individuals in the organization. It would be beneficial to have a secondary notification system that does not require external input from a individual.

SUMMARY

Systems, methods, features, and advantages of the present invention will be or will become apparent to one with skill in the art upon examination of the following figures and detailed description. It is intended that all such additional systems, methods, features, and advantages be included within this description, be within the scope of the invention, and be protected by the accompanying claims.

In one embodiment embodying principles of the invention, an emergency notification system is provided including a switching unit, a plurality of communications devices in communication with the switching unit, an emergency response unit in communication with the switching unit, and a plurality of receiving units in communication with the switching unit. Each of the communications devices is configured to transmit an emergency notification to the switching unit which includes a message and at least one receiving unit address. Further, the switching unit is configured to receive the emergency notification from at least one of the plurality of communication devices and to rebroadcast the emergency notification contained in the message to the emergency response unit and to the receiving unit corresponding to the receiving unit address.

In another embodiment of the present invention a method is provided including the steps of transmitting an emergency notification including a emergency notification and a receiving unit address from a communication unit to a switching unit and transmitting the emergency notification from the switching unit to a emergency response unit and to the receiving unit corresponding to the receiving unit address in the emergency notification.

BRIEF DESCRIPTION OF THE DRAWINGS

The accompanying drawings, which are incorporated in and constitute a part of this specification, illustrate an implementation of the present invention and, together with the description, serve to explain the advantages and principles of the invention. In the drawings.

DETAILED DESCRIPTION

Figure 1:
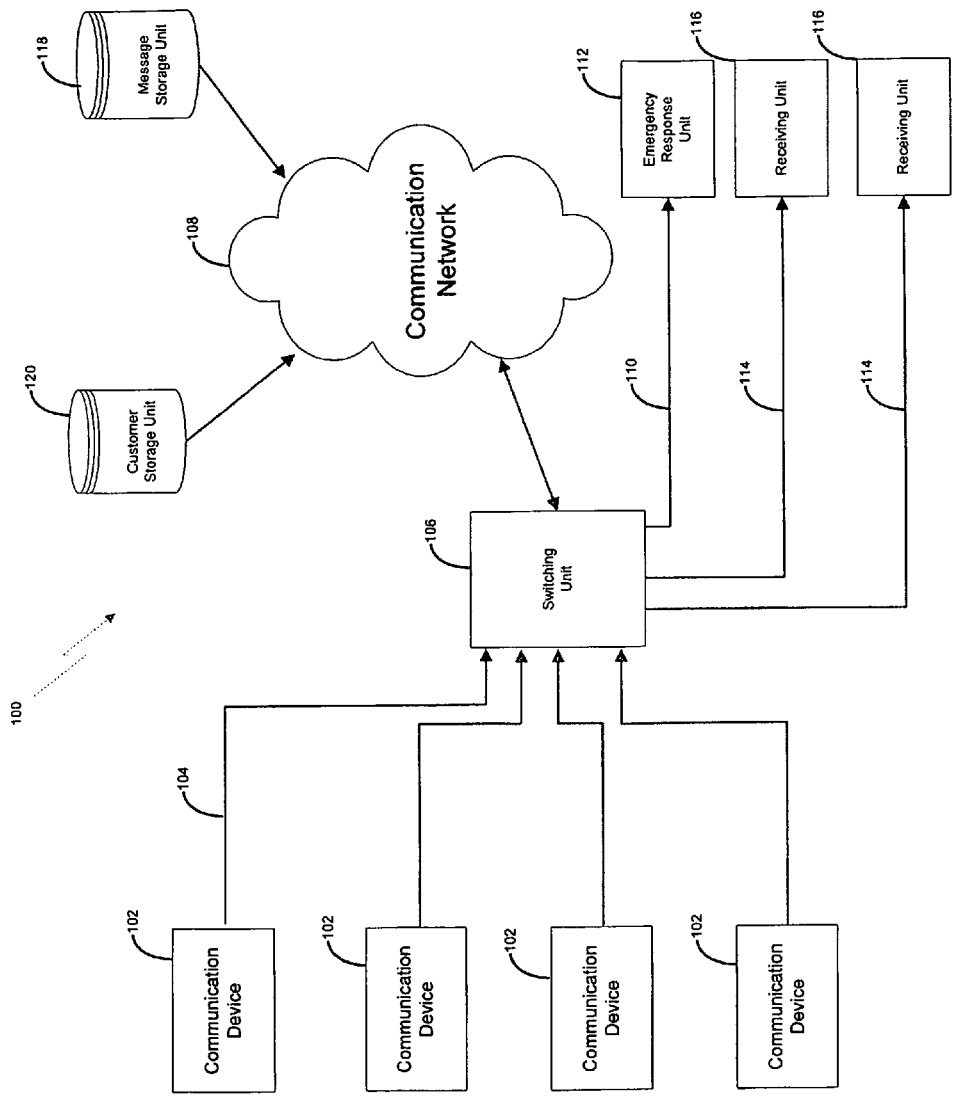
FIG. 1 depicts a schematic one embodiment of an emergency notification system consistent with the present invention.

Referring now to the drawings which depict different embodiments consistent with the present invention, wherever possible, the same reference numbers will be used throughout the drawings and the following description to refer to the same or like parts.

FIG. 1 depicts a schematic of one embodiment of an emergency notification system 100 consistent with the present invention. The emergency notification system 100 includes at least one communication device 102 in communication with a switching unit 106 over a first network 104. The emergency notification system 100 also includes a client storage unit 120 and message storage unit 118 in communication with switching unit 106 over a second network 108. The emergency notification system 100 also includes an emergency response unit 112 in communication with the switching unit 106 over a third network 110. The switching unit 106 is also in communication with at least one receiving unit 116 over a fourth network 114.

In general, the switching unit 106 receives a notification of an emergency from one of the communication devices 102, removes information from the notification and forwards the notification on to the emergency response unit 112 and to selected receiving units 116. In one embodiment, the switching unit 106 is configured to receive notifications from each of the communication devices 102, remove a receiving unit 116 address and message from the notification and re-broadcast the message to the emergency response unit 112 and the address of the receiving unit 116 retrieved from the notification.

The switching unit 106, client storage unit 120, and message storage unit 118 may be embodied by one or more then one servers. Alternatively, each of the switching unit 106, client storage unit 120 and message storage unit 118 may be implemented using any combination of hardware and software, whether as incorporated in a single device or as a functionally distributed across multiple platforms and devices. As a illustrative example, the message storage unit 116 may be served off of a VOIP or TDM switch or another carrier's network device.

In one embodiment, the switching unit 106 is a cellular switch, voice over internet protocol ("VOIP") switch or soft switch, a time division multiplexing switch ("TDM") or any other suitable. In another embodiment, the client storage unit 120 and message storage unit 118 may be servers, workstations, network appliances or any other suitable data storage devices. In yet another embodiment, the client storage unit 120 and message storage unit 118 may be combined into a single server, workstation, network appliance or suitable data storage device. In another embodiment, the communication devices 102 may be any combination of cellular phones, telephones, personal data assistants, or any other suitable communication devices. In addition, the receiving units 116 may be any combination of cellular phones, telephones, personal data assistants, or any other suitable communication devices. The emergency response unit 112 may be a server, workstation or other device capable of receiving digitized data. In addition, the emergency response unit 112, may be part of a 911 call center, network operating center ("NOC"), central station monitoring center, or any other emergency monitoring system.

In one embodiment, the communication networks 104, 108, 110, and 114 may be any private or public communication network known to one skilled in the art such as a Local Area Network ("LAN"), Wide Area Network ("WAN"), Peer-to-Peer Network, Cellular network or any suitable network, using standard communication protocols. The communication network 104 may include hardwired as well as wireless branches.

In one embodiment, the switching unit 106 is configured to convert notifications received from the communication devices 102 to the appropriate protocol of each of the second, third and fourth networks 108, 110 and 114. As a illustrative example, the switching unit may convert an analog phone signal received from the first network 104, to a TCP/IP packet on the second network 108. Additionally, the switching unit 106 may be configured to receive different types of messages such as voice communication messages, video messages, short message service messages and other network transmittable audio or video based messages. Further, the switching unit 106 may be configured to identify when an emergency notification is sent from a communication device 102 and to forward the emergency notification to the emergency response unit 112.

In one embodiment, the switching unit 106 is configured with multiple ports and is capable of receiving multiple notifications from the communication devices 102. In one implementation, the switching unit 106 is configured to detect an emergency code, flag, or other indicator or otherwise analyze the contents of each notification received by the switching unit 106 to determine if the notification is an emergency notification. If the switching unit 106 determines that the notification is an emergency notification, the emergency notification is isolated for further analysis and redistribution.

In another implementation, after the switching unit 106 has determined the notification received from the first network 104 is an emergency notification, the switching unit 106 may be configured to parse the emergency notification and retrieve a receiving unit 116 address and message text from the emergency notification. The switching unit 106 may then forward the emergency notification to the emergency response unit 112 via the third network 110 for further processing. Further, the switching unit 106 may transmit the message text to the receiving unit 116 associated with the receiving unit address via the fourth network 114.

In yet another embodiment, the switching unit 106 may be configured to determine the network address of the communication device 102 sending the notification and to forward the network address of the communication device 102 to the client storage unit 120 and message storage unit 118. The client storage unit 120 may be configured to retrieve at least one receiving unit 116 network address from a client library running on the client storage unit 120 based on the communication device 102 address transmitted from the switching unit 106. Once discovered in the client library, the client storage unit 120 may transmit the receiving unit network address to the switching unit 106.

The message storage unit 118 may also be configured to retrieve a message from a message library on the message storage unit 118 based on the communication unit 102 address transmitted from the switching unit 106. Once retrieved from the message library, the message storage unit 118 may transmit the message to the switching unit 106. The switching unit 106 may be configured to re-broadcast the emergency notification to the addresses of the receiving units 116 transmitted by the client storage unit 120 via the fourth network 112.

Figure 2:
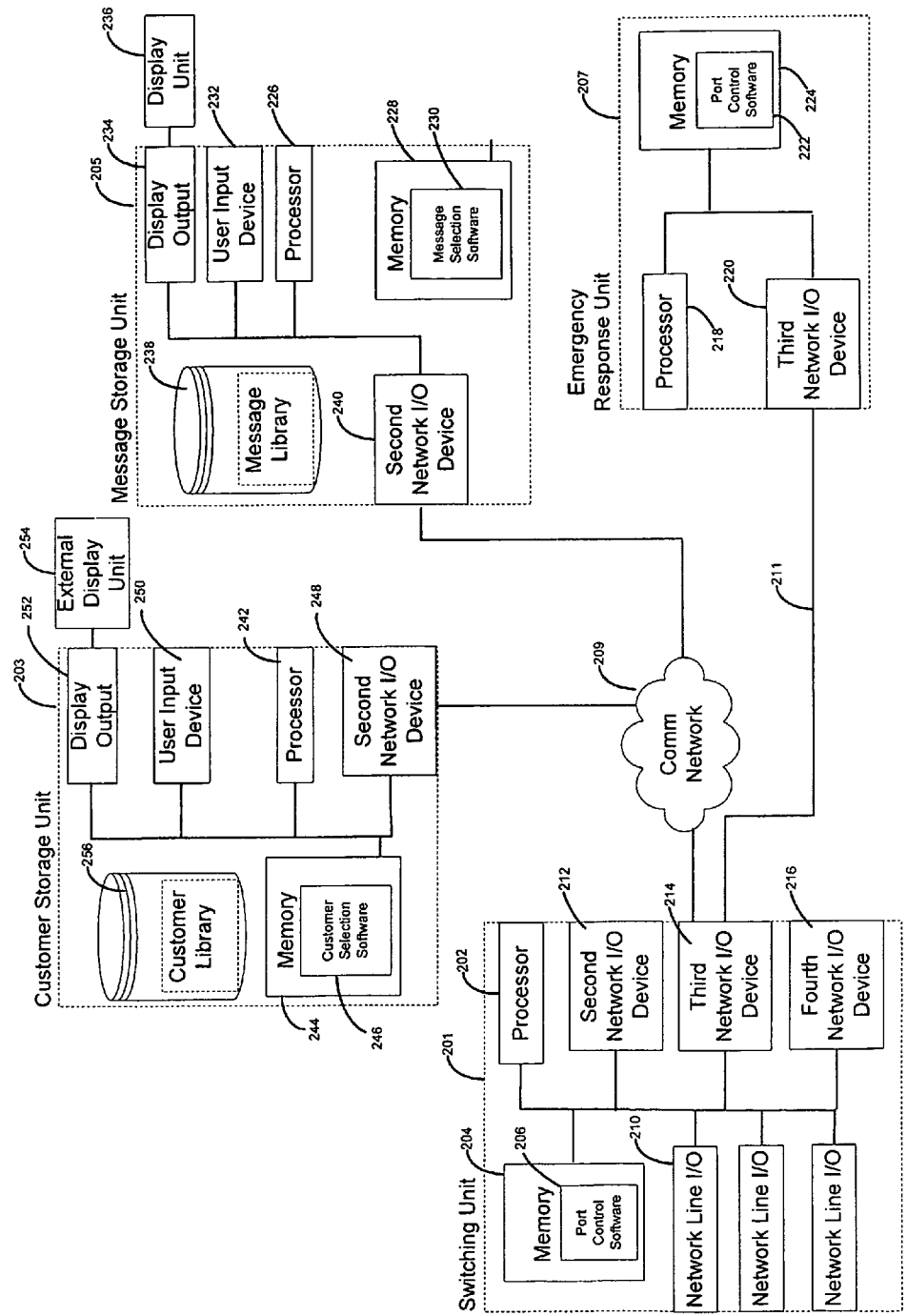
FIG. 2 depicts one embodiment of the client unit, message unit, switching unit and emergency response unit consistent with the present invention.

FIG. 2 depicts one embodiment of the switching unit 201, client unit 203, message unit 205, and emergency response unit 207 consistent with the present invention. The switching unit 201 includes a processor 202, memory 204 running port communication software 206, a network I/O device 208 and a plurality of network line I/O devices 210. The second network I/O device 208 is operatively configured to communicate with the network 209. The port communication software 206 running in the memory 204 of the switching unit 201 is operatively configured to receive notifications from each of a plurality of communication devices such as communication devices 102 of FIG. 1 via each network line I/O device 210. In addition, the port communication software 206 is configured to re-broadcast an emergency notification to the network 209, the network 211 and another network such as 114 of FIG. 1.

In one embodiment, the processor 202 may be a central processing unit ("CPU"), a application specific integrated circuit ("ASIC"), a microprocessor or any other suitable processing device. The memory 204 may include a hard disk, random access memory, cache, removable media drive, mass storage or configuration suitable as storage for data, instructions, and information. In one embodiment, the memory 204 and processor 202 may be integrated. The memory may use any type of volatile or non-volatile storage techniques and mediums. The network I/O line 210 device may be a network interface card, a plain old telephone service ("POTS") interface card, an ASCII interface card, or any other suitable network interface device. The network I/O interface devices may be a network interface card, a wireless network interface card or any other suitable network interface device. The port communication software 206, may be an advanced intelligent network ("AIN") application, a compiled program running on a server, a process running on a microprocessor or any other suitable port control software.

The client storage unit 203 includes a processor 242, memory 244 running client selection software 246, a second network I/O device 248, a display output 252, a external display unit 254, and a user input device 250. The second network I/O device 248 is operatively configured to communicate with the network 209. The client selection software 246 running in the memory 244 of the client storage unit 203 is operatively configured to query the client library 256 in order to retrieve addresses of receiving units such as receiving units 116 associated with a communication device address. In addition, the client selection software 246 is further configured to transmit the receiving unit addresses from the client library to the switching unit 201.

In one embodiment, the processor 242 may be a central processing unit ("CPU"), an application specific integrated circuit ("ASIC"), a microprocessor or any other suitable processing device. The memory 244 may include a hard disk, random access memory, cache, removable media drive, mass storage or configuration suitable as storage for data, instructions, and information. In one embodiment, the memory 244 and processor 242 may be integrated. The memory may use any type of volatile or non-volatile storage techniques and mediums. The second network I/O device 248 may be a network interface card, a wireless network interface card or any other suitable network interface device. The client library

256 may be a flat file, a database, an extensible markup language ("XML") file, or any suitable data storage software. The display output 252 may be a composite video output, an RGB output, an HD video output or another suitable display output. The display unit 254 may be a liquid crystal display monitor or cathode ray tube monitor or any other suitable display device.

The client selection software 246 may be a compiled program running on a server, a process running on a microprocessor or any other suitable client selection software. The client selection software 246 is configured to work with the network I/O device 248 or independently communicate with the network I/O device 248. In one embodiment, the client selection software 246 is configured to query a database for a first address and return a list of secondary address associated with the first addresses to the switching unit. The user input device may be a mouse or keyboard, or any other suitable use input device.

The message storage unit 205 includes a processor 226, memory 228 running message selection software 230, a second network I/O device 240, a display output 234, an external display unit 236, and a user input device 232. The second network I/O device 240 is operatively configured to communicate with the network 209. The message selection software 246 running in the memory 230 of the message storage unit 205 is operatively configured to query the message library 238 in order to retrieve addresses of receiving units such as receiving units 116 associated with a communication device address. In addition, message selection software 230 is further configured to transmit the selected messages from the message library to the switching unit 201.

In one embodiment, the processor 242 may be a central processing unit ("CPU"), a application specific integrated circuit ("ASIC"), a microprocessor or any other suitable processing device. The memory 228 may include a hard disk, random access memory, cache, removable media drive, mass storage or configuration suitable as storage for data, instructions, and information. In one embodiment, the memory 228 and processor 242 may be integrated. The memory may use any type of volatile or non-volatile storage techniques and mediums. The second network I/O device 240 may be a network interface card, a wireless network interface card or any other suitable network interface device. The message library 238 may be a flat file, a database, an extensible markup language ("XML") file, or any suitable data storage software. The display output 234 may be a composite video output, an RGB output, an HD video output or another suitable display output. The display unit 236 may be a liquid crystal display monitor or cathode ray tube monitor or any other suitable display device.

In another embodiment, the message selection software 230 may be a compiled program running on a server, a process running on a microprocessor or any other suitable client selection software. The message selection software 230 may be configured to work with the network I/O device 240 or independently communicate with the network I/O device 240. In one embodiment, the message selection software 230 may be configured to query a database, running on the message storage unit 205, for a device address and return a message associated with the device address to the switching unit 201.

In one embodiment, the emergency response unit 207 may include a processor 218, memory 224 running port control software 222, and a third network I/O device 220. The third network I/O device 240 is operatively configured to communicate with the network 211. The port control software 222 running in the memory 224 of the emergency response unit 207 is operatively configured to receive messages from the switching unit 201.

In one embodiment, the processor 218 may be a central processing unit ("CPU"), a application specific integrated circuit ("ASIC"), a microprocessor or any other suitable processing device. The memory 224 may include a hard disk, random access memory, cache, removable media drive, mass storage or configuration suitable as storage for data, instructions, and information. In one embodiment, the memory 224 and processor 218 may be integrated. The memory may use any type of volatile or non-volatile storage techniques and mediums. The third network I/O device 220 may be a network interface card, a wireless network interface card or any other suitable network interface device.

In one embodiment, the port control software 222 may be a compiled program running on a server, a process running on a microprocessor or any other suitable client selection software. The port control software 222 may be configured to work with the network I/O device 240 or independently communicate with the network I/O device 240. In one embodiment, the port control software 222 may be configured to receive a notification from the switching unit 201.

Figure 3:
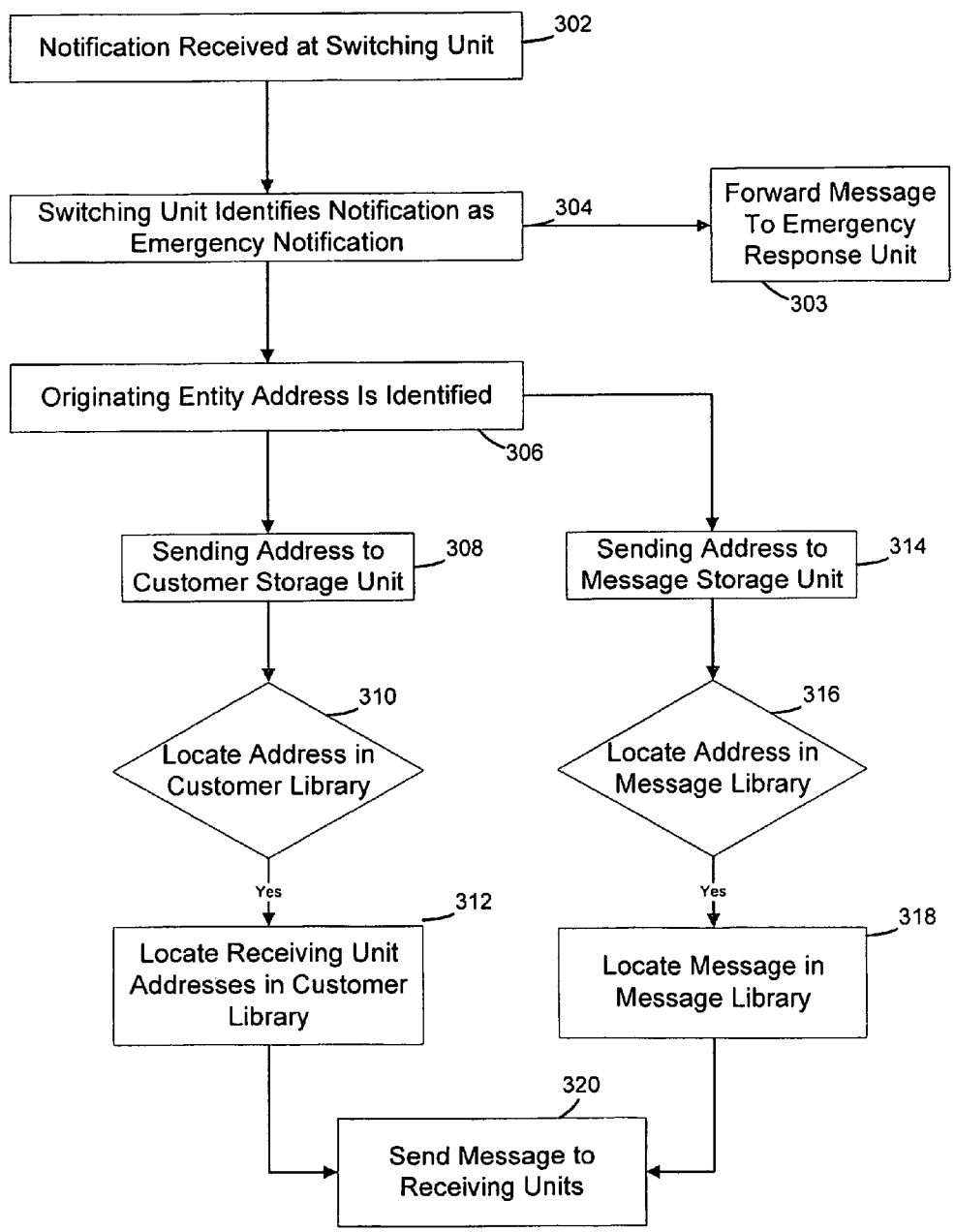
FIG. 3 depicts a schematic representing one embodiment of the operation of the switching unit.

FIG. 3 depicts a schematic representing one embodiment of the operation of a switching unit. The switching unit receives a notification via the first network (Step 302). Next, the switching unit recognizes the notification as an emergency notification (Step 304) and also identifies the address of the entity sending the emergency notification (Step 306). If the notification is a emergency notification, the switching unit immediately forwards the notification to the emergency receiving unit. Next, the originating address is sent to the client storage unit (Step 308). The client storage unit queries the client library to determine if the originating address resides in the client library (Step 310). If the address resides in the client library, the client storage unit retrieves the receiving unit addresses associated with the originating address and sends the addresses to the switching unit (Step 312).

At the same time the originating address is sent to the client storage unit, the switching unit may also sends the originating address to the message storage unit (Step 314). The message storage unit queries the message library to determine if the originating address resides in the message library (Step 316). If the originating address resides in the message library, the message storage unit retrieves the message associated with the originating address from the message library (Step 318). The message storage unit then sends the message to the switching unit. Once the switching unit has the message and the receiving unit addresses, the switching unit sends the message to all of the receiving unit addresses retrieved by the client storage unit (Step 320).

Figure 4:
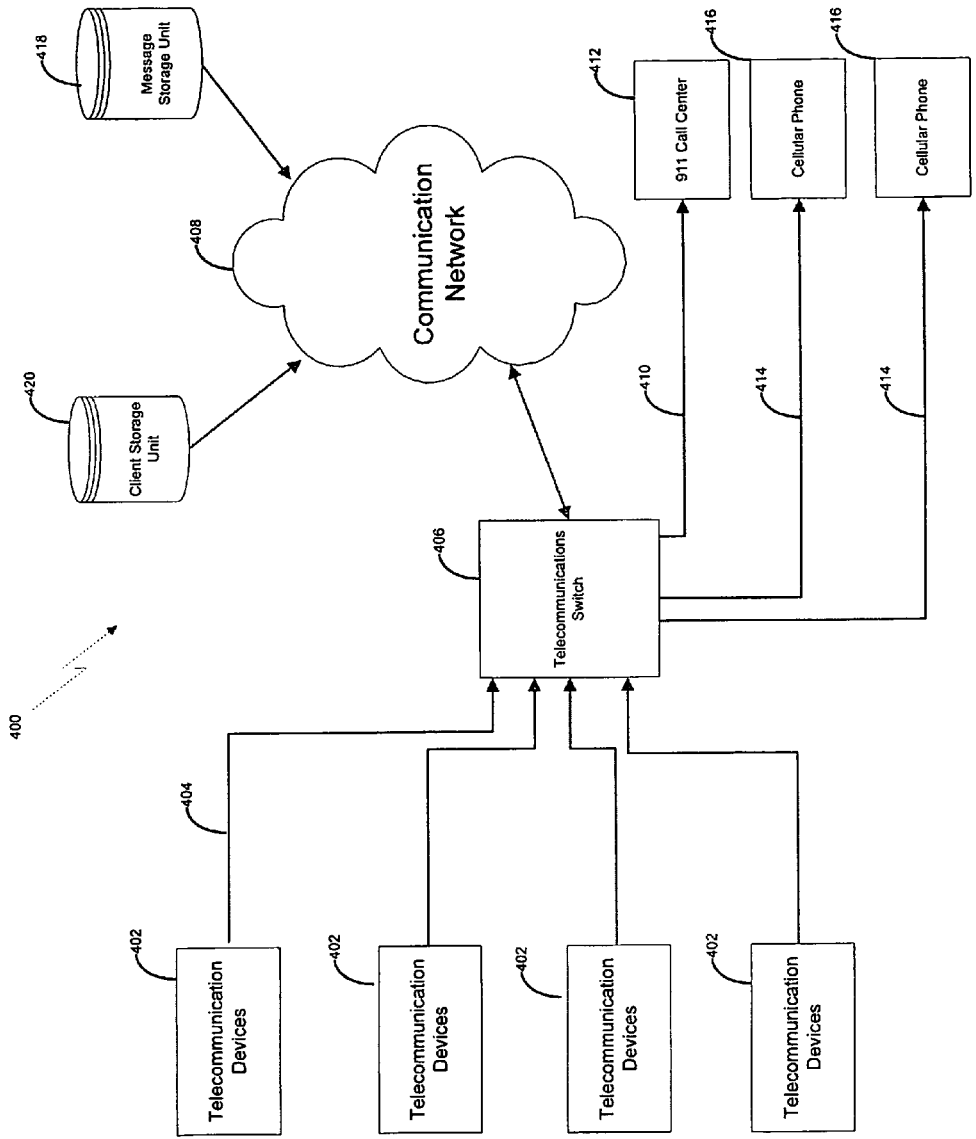
FIG. 4 depicts a schematic of one embodiment of an emergency notification system consistent with the present invention.

FIG. 4 is an illustrative example of an emergency notification system 400. In this embodiment, the emergency notification system 400 includes a plurality of telecommunication devices 402, a 911 call center 412, a plurality of cellular phones 416, a client storage unit 420 and a message storage unit 418. The telecommunications devices 402 send an emergency notification to the telecommunications switch 406 in the form of a 911 message. The telecommunications switch 406 receives the 911 message and determines the address of the telecommunications device 402 which sent the 911 message. The telecommunications switch 406 then sends the 911 message to the 911 call center 412 over the Public Service Telephone Network ("PSTN") line 410.

The telecommunications switch 406 also sends the telecommunications device address to the client storage unit 420 and message storage unit 418. The client storage unit 420 queries a database running on the client storage unit 420 to determine if the telecommunications device 402 address resides in the database. If the telecommunications device 402 address does reside in the database, the client storage unit 420 queries the database to retrieve a listing of cellular phone 416 addresses. The client storage unit 420 then sends the cellular phone 416 addresses to the telecommunications switch 406.

The message storage unit 418 queries a database, running on the message storage unit 418, to determine if the telecommunications device 402 address resides in the database. If the telecommunications device 402 address does reside in the database, the message storage unit 418 queries the database to retrieve the message text to include in the notification to the cellular devices 416. The message storage unit 418 then sends the message text to the telecommunications switch 406. The telecommunication switch 406 then calls the address or telephone number of each cellular phone 416 and plays the message received from the message storage unit 418.

In this embodiment, the telecommunications devices 402 may be a VOIP phone, analog phone, cellular phone or any other suitable telecommunications device. The telecommunications switch may be a VOIP switch, TDM switch or any other suitable telecommunications switching device. Further, the client storage unit 420 and message storage unit 418 may be one or more servers running database software.

In another embodiment, the client storage unit 420 includes a user interface which allows an end user to enter cellular phone addresses and message text to distribute when a emergency notification occurs for a given client. Additionally, this interface may allow the assignment of telecommunication devices to a specific client account in the client storage unit 420.

In another embodiment consistent the current embodiment, the telecommunications device 402 may be configured to detect an alert, such as the dialing of 9-1-1 or another predefined sequence of numbers, and to transmit the alert to the telecommunications switch 406 along with a unique identifier for the telecommunications device 402. The telecommunications switch 406 may be configured to receive the alert from the telecommunications device 402 and to send a receipt verification to the telecommunications device 402. The telecommunications device 402 may be configured to receive the verification from the telecommunications switch 406 and to retrieve a message stored in a message library in the memory of the telecommunications device 402 based on the alert detected. The message may include, but not be limited to, a verification that the telecommunications switch has received the alert, instructions on how to respond to the alert, and any other information based on the type of alert encountered.

Figure 5:
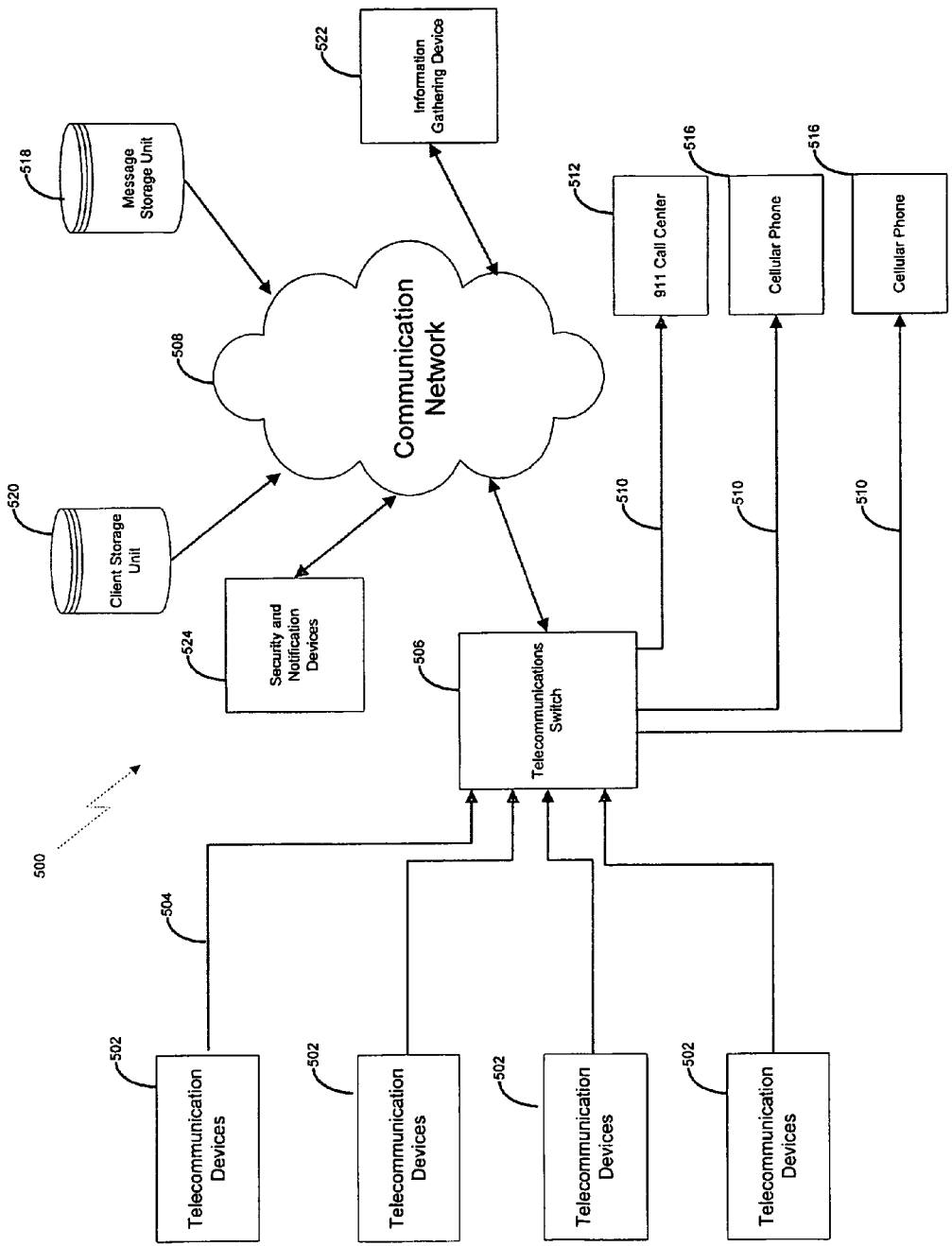
FIG. 5 is an illustrative example of an emergency notification system 500 consistent with the present invention.

FIG. 5 is an illustrative example of an emergency notification system 500 consistent with the present invention. In this embodiment, the telecommunications device 502 may be configured to recognize the dialing of a sequence of number, such as the dialing of 9-1-1 or another predefined sequence of numbers, as an alert and to transmit the sequence of numbers and a unique identifier indicating the telecommunications device 502 to a telecommunications switch 506. The telecommunications device 506 may be configured to send the unique identifier and sequence of numbers to a message storage unit 518 and a client storage unit 520. The client storage unit 520 may be configured to retrieve a plurality of cellular phone 516 addresses or telephone numbers associated with the alert and address from a client library on the client storage unit 520. In addition, the client storage unit 520 may be configured to retrieve a plurality of addresses of information gathering devices 522, such as but not limited to surveillance cameras, weather reporting stations, security systems, and any other information systems, along with an identifier indicative of the type of device associated with the address and a address to forward any received information from a client library on the client storage unit 520 based on the telecommunications device 502 identifier and sequence of numbers received.

The client storage unit 520 may be configured to also send the list of addresses and device identifiers received from the client library to the telecommunications switch 506. The telecommunications switch 506 may be configured to retrieve information from each of the information gathering device 522 addresses received from the client storage unit 520 and to transmit any information received from the information gathering devices 522 to appropriate forwarding addresses as received from the client storage unit 520.

In another illustrative example consistent with the current embodiment, one communications device 502 may detect the dialing of a sequence of numbers, such as 123, the telecommunications device 502 may then search an alert library in the memory of the telecommunications device 502 to determine if the sequence of numbers represents an alert. If the sequence of numbers are found in the telecommunications device 502 alert library, the numbers may be forwarded to the telecommunication switch 506 along with the address of the telecommunications device 502.

The telecommunications switch 506 may forward the sequence of numbers and the telecommunications device 502 identifier to the client storage unit 520. The client storage unit 520 may query a client library to retrieve a list of receiving unit 516 addresses, information gathering unit 522 addresses, information gathering equipment types and information gather device forwarding addresses based on the telecommunications device 502 address and the sequence of numbers. The client storage unit 520 may then transmit the information received from the query to the telecommunications switch 506. The telecommunications switch may request information from each of the information gathering devices 522 and may then transmit the information received to the predetermined forwarding addresses for further analysis. For example, the telecommunications switch 506 may retrieve video from surveillance cameras and forward the video to a central command unit for further analysis.

In another illustrative example consistent with the current embodiment, the telecommunications device 502 may be configured to initiate reactions in security and notification devices 524, such as, but not limited to, unlocking and locking door locks, turning on strobe lights, turning on sirens and other security devices. For example, one of the plurality of telecommunications device 502 may detect the dialing of a sequence of numbers. The telecommunications device 502 may be configured to search the a alert library stored in the memory of the telecommunications device 502 to determine if the number sequence is a predetermined alert. If the number sequence is a predetermined alert, the telecommunications device may be configured to send commands to a plurality of security and notification devices 524.

For example, if the telecommunications device 502 detects the dialing of a predetermined sequence of numbers, such as "*894", the telecommunications device 502 may search its memory to determine if "*894" is listed in a alert library stored in memory. If "*894" is associated with a alert, such as a assault, the telecommunications device 502 may send a command to a security and notification device 524, such as a siren, to turn the security and notification device on.

The benefits of an emergency notification system as detailed above includes immediate secondary notification of an emergency situation, customizable messaging of emergency notices to cellular phones, and a streamlined method of alerting individuals of a emergency event. By providing an emergency notification system as described herein, an organization can effectively and efficiently monitor critical emergency situations arising at a facility. This allows for up to the minute monitoring of emergency situations that may effect the operations of the organization.

While various embodiments of the present invention have been described, it will be apparent to those of skill in the art that many more embodiments and implementations are possible that are within the scope of this invention. Accordingly, the present invention is not to be restricted except in light of the attached claims and their equivalents.

What is claimed is:

1. An emergency notification system comprising:
a switching unit;
an emergency response unit in communication with the switching unit;
a client storage unit configured to store a plurality of receiving unit addresses associated with a plurality of client identifiers; and
a message storage unit configured to store a plurality of messages associated with the plurality of client identifiers;
wherein,
the switching unit is configured to, in response to detecting an alert sent from a client, transmit the alert to the emergency response unit;
the switching unit is configured to transmit an identifier associated with the client to the client storage unit and the message storage unit;
the client storage unit is configured to:
retrieve at least one receiving unit address associated with the identifier, at least one information gathering device address, and at least one information forwarding address; and
transmit the retrieved receiving unit address, the information gathering device address, and the information forwarding address to the switching unit;
the message storage unit is configured to retrieve at least one emergency notification message associated with the identifier and to transmit the retrieved message to the switching unit; and
the switching unit is configured to:
retrieve information from the information gathering device;
transmit the retrieved message to the retrieved receiving unit address; and
transmit the retrieved information to the information forwarding address.

2. The emergency notification system of claim 1, wherein the switching unit, client storage unit, and message storage unit communicate using one of a TCP/IP network, a PSTN network and a cellular network.

3. The emergency notification system of claim 1, wherein the client storage unit and message storage unit reside on the switching unit.

4. The emergency notification system of claim 1, wherein the receiving unit is one of a telephone, cellular phone and voice over IP phone.

5. The emergency notification system of claim 1, wherein the emergency notification is a recorded voice message.

6. The emergency notification system of claim 1, wherein the emergency notification is a computer generated voice message.

7. A method of transmitting emergency information, including the steps of:

detecting an alert sent from a client via a switching unit;
transmitting the alert from the switching unit to an emergency response unit;
determining an identifier associated with the client;
transmitting the identifier to a client storage unit and a message storage unit;
matching the identifier with a plurality of client unit addresses stored in a client library on the client storage unit;
retrieving at least one receiving unit address, at least one information gathering device address, and at least one information forwarding address from the client library based on the client unit address;
transmitting the at least one receiving unit address, the information gathering device address, and the information forwarding address to the switching unit;
retrieving information from the information gathering device;
retrieving an emergency notification from a message library on the message storage unit based on the identifier and transmitting the emergency notification to the switching unit;
transmitting the emergency notification from the switching unit to each one of the receiving units associated with the receiving unit addresses; and
transmitting the retrieved information to the information forwarding address.

8. The method of claim 7, wherein the switching unit, client storage unit, and message storage unit communicate using one of a TCP/IP network, a PSTN network and a cellular network.

9. The method of claim 7, wherein the client storage unit and messaging unit reside on the switching unit.

10. The method of claim 7, wherein the receiving unit is one of a telephone, cellular phone and voice over IP phone.

11. The emergency notification system of claim 7, wherein the emergency notification is a recorded voice message.

12. The emergency notification system of claim 7, wherein the emergency notification is a computer generated voice message.

13. An emergency transmitting system comprising:
a plurality of communication units in communication with an alert receiving unit;
a client storage unit configured to store a plurality of addresses associated with a plurality of client identifiers; and
a message storage unit configured to store a plurality of messages associated with the plurality of client identifiers;
wherein,
an alert is detected by at least one of the communication units, and
each communication unit detecting the alert transmits a unique identifier to the alert receiving unit;
the alert receiving unit is configured to transmit the identifier to the client storage unit and the message storage unit;
the client storage is configured to:
retrieve at least one receiving unit address, at least one information gathering device address, and at least one information forwarding address associated with the identifier; and
transmit the retrieved receiving unit address, the information gathering device address, and the information forwarding address to the alert receiving unit;

the message storage unit is configured to retrieve at least one message associated with the identifier and to transmit the retrieved message to the alert receiving unit; and the alert receiving unit is configured to:
retrieve information from the information gathering device;
transmit the retrieved message to each one of the receiving units associated with the retrieved receiving unit addresses;
transmit the retrieved information to the information forwarding address.

14. The emergency transmitting system of claim 13, wherein the communication unit, the client storage unit, and the message storage unit communicate using one of a TCP/IP, wireless or cellular network.

15. The emergency transmitting system of claim 13, wherein the communication units are analog telephones.

16. The emergency transmitting system of claim 13, wherein the communication units are voice over Internet Protocol telephones.

17. The emergency transmitting system of claim 13, wherein the client storage unit and message storage unit reside on the alert receiving unit.

* * * * *